UNITED STATES PATENT OFFICE.

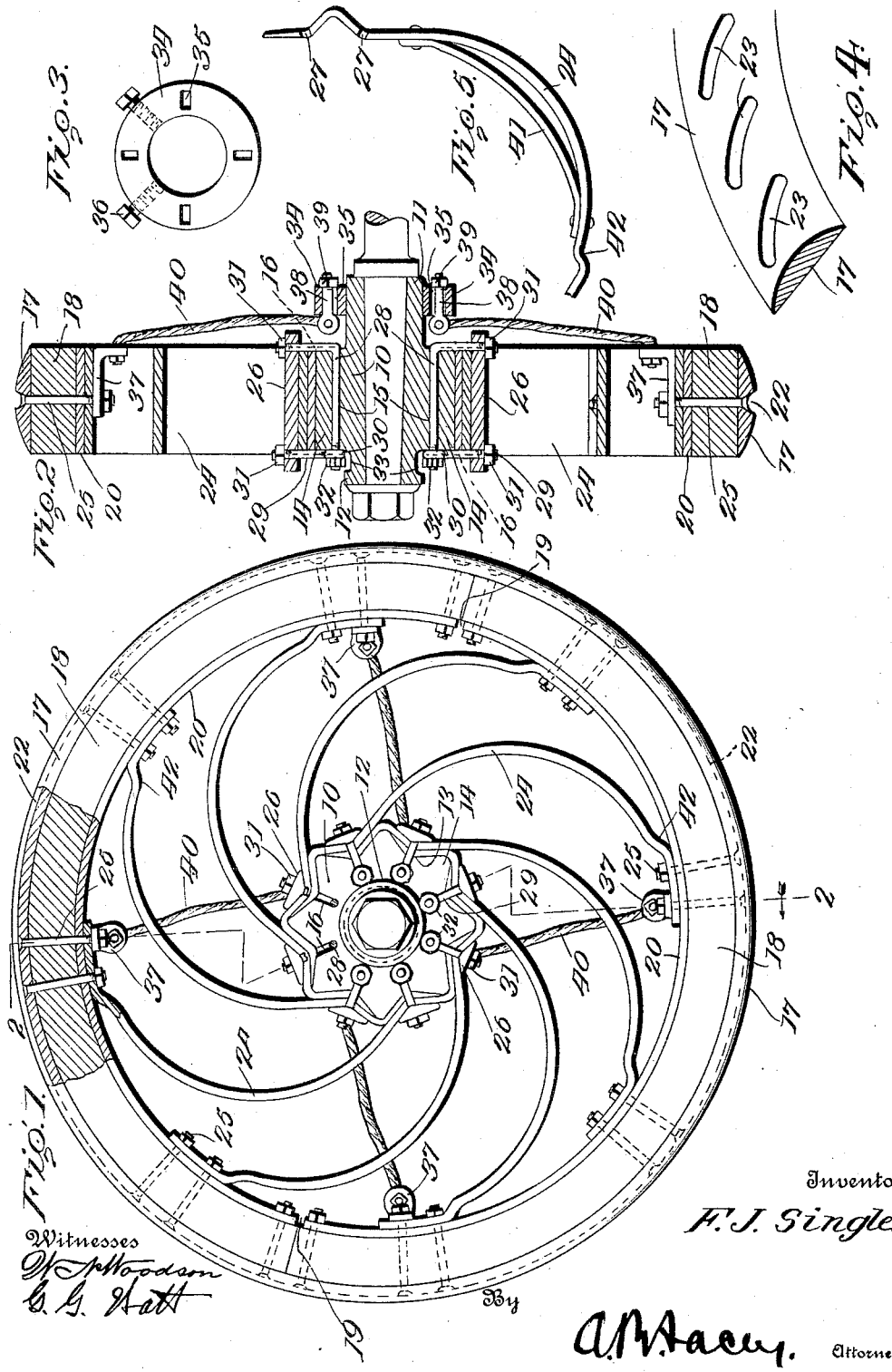

FRANK J. SINGLER, OF IRVING, ILLINOIS.

WHEEL.

1,044,699.

Specification of Letters Patent.

Patented Nov. 19, 1912.

Application filed October 24, 1911. Serial No. 656,460.

*To all whom it may concern:*

Be it known that I, FRANK J. SINGLER, citizen of the United States, residing at Irving, in the county of Montgomery and State of Illinois, have invented certain new and useful Improvements in Wheels, of which the following is a specification.

This invention relates to improvements in wheels, more particularly to the class of spring wheels employed for use in connection with automobiles, bicycles, and similar vehicles, and has for one of its objects to improve the construction and increase the efficiency and utility of devices of this character.

Another object of the invention is to provide a device of this character in which the strains are uniformly distributed and the tendency to unequal strains counteracted.

With these and other objects in view, the invention consists in certain novel features of construction as hereafter shown and described, and then specifically pointed out in the claims, and in the drawings illustrative of the preferred embodiment of the invention: Figure 1 is a side elevation of the improved wheel partly in section; Fig. 2 is a section on the line 2—2 of Fig. 1; Fig. 3 is a detached view of the cable straining member; Fig. 4 is a perspective view of a portion of the tire employed on the rear wheel of an automobile; Fig. 5 is a view of a modified form of spring spoke.

Corresponding and like parts are referred to in the following description and indicated in all the views of the drawings by the same reference characters.

The improved wheel comprises a hub constructed with an intermediate body portion 10, rearwardly and forwardly directed sleeve portions 11—12, and bored to engage over the axle journal in the ordinary manner. The periphery of the hub is formed with alternating depressions 13 and projections 14, the communicating depressions and projections having angular walls as shown. Any required number of the projections and depressions may be employed and will correspond in number with the spokes of the wheel. For illustration, eight of the depressions are shown, and eight of the spokes are likewise employed, but it will be understood that this number may be increased or decreased, as required.

The body of the hub 10 is provided with a transverse aperture 15 opposite the bottom of each of the depressions 13, and with radial guideways 16 in the side faces of the hub, the guideways terminating at the bottoms of the depressions 13.

The tire of the wheel is formed of an endless band of metal represented as a whole at 17 rounded or oval shaped externally, and with its inner face flat as represented in Fig. 2, and an inner supporting member or felly 18 preferably of wood and divided into two semi-circular portions closely engaging at their junctures, and an inner metal band 20 bearing against the inner face of the wood members 18, and also formed in two parts slightly spaced apart at their confronting ends as shown at 19, and preferably opposite the joints between the members 18. The three members 17, 18 and 20, are united at suitable intervals by clamp bolts 25, the outer ends of the clamp bolts being countersunk in the outer face of the tire 17. The tire 17 which is employed upon the forward wheels of automobiles, is provided with an encircling groove 22 to prevent the forward wheels from "skidding" during the steering movements, while the tire which is employed upon the rear wheels of automobiles is provided with a plurality of oblique depressions or grooves as shown at 23 in Fig. 4, to enable the rear wheels to grip the ground and prevent slipping. The bolts 25 which are employed upon the band of the forward wheel or the bands which are provided with the grooves 22, are countersunk in the bottoms of the grooves, as shown in Fig. 2, and preferably the bolts will be likewise countersunk in the bottoms of the oblique channels 23 when employed upon tires having the oblique channels. By this means the heads of the bolts are protected from injury during the operation of the wheels.

The spokes of the improved wheel are each formed of a strip of spring steel represented conventionally at 24 and curved as shown, and secured at their outer ends by certain of the bolts 25, each spoke being preferably perforated to receive two of the bolts. Each spoke is likewise bent inwardly next to the holding bolts as shown at 42, so that the grip between the holding bolts and the supporting band 20, is increased. At their inner ends the spokes are bent to conform to one of the projections 14 and two of the depressions 13, each spoke thus fitting closely for a considerable distance against the irregular surface of the body of the hub as shown. It will be noted by this arrangement that the spokes overalp where they are engaged with the hub. Bearing upon the portions of the spokes which are engaged in the depressions 13, is a clamp plate 26 which is formed with an angular inner face to correspond to the angular faces or bends of the spokes and perforated at the ends to receive the clamp bolts. The apertures of the clamp plates are spaced apart a less distance than the width of the spoke material and the spokes are provided with recesses 27 to receive the clamp bolts and thus effectually prevent displacement. The clamp bolts by which the spokes are secured to the hubs, are each formed in two parts, an L-shaped portion 28 which is passed by one arm through one of the apertures 15 of the hub body, and with the other arm extending through one of the recesses 16 and thence through the notches 27 and the apertures of the plate 16, while the other portion 29 of the bolt is formed with an eye 30 to bear over the protruding end of the bolt 28 and extends in the other recess 16 of the hub body and likewise through the notches 27 and the apertures of the clamp plate 26. At their upper ends the bolts 28—29 are threaded to receive clamp nuts 31, while the end of the bolt 28 which extends through the eye 30 is likewise provided with a clamp nut 32. The apertures 15 are located as near as possible to the bore of the hub and the sleeve 12 is provided with recesses 33 opposite the apertures 15 to receive the lower portions of the eye 30 and the nut 32 and enable the latter to be rotated to apply strain to the bolt. The nuts 32 are preferably formed with a plurality of sides so that a special form of wrench or a pair of pipe tongs may be employed to rotate the nut. By this means the clamp bolts are located as close as possible to the axle journal. By this simple means the spokes are firmly clamped to the hub and reinforced and supported. Bearing upon the inner sleeve 11 of the hub is a collar 34 having a plurality of radial slots 35 and provided with set screws 36 by which it may be adjustably clamped to the sleeve. By loosening the set screws the collar can be rotated upon the sleeve, and then by setting the set screws again the collar can be immovably coupled to the sleeve. Connected to the band 20 of the wheel are a plurality of clips 37 and inserted through each of the slots 35 is an eye bolt 38, having a clamp nut 39 to support it in position. Connected at one end to each of the clips 37 is a section of wire cable 40, each cable section being connected respectively at its inner end to one of the eye bolts 38. By this arrangement it will be obvious that by loosening the set screws 36, the collar 34 may be rotated upon the sleeve 11 to regulate the lengths of the cable sections. The cables will be left slightly slack, so as not to interfere with the action of the spring spokes.

When the wheel is in operation, and a sufficient pressure is applied to the wheel to depress the spokes, the cable sections will not interfere with the requisite "springy" action of the spokes, but in event of the breakage of one or more of the spokes, the cables will prevent the collapse of the wheel. The cables are thus important features of the improved wheel as they reinforce the spokes and increase their utility and efficiency.

The improved wheel is simple in construction, can be strongly constructed and adapted without material structural changes to wheels employed upon bicycles, motorcycles, automobiles of various kinds, and is adapted for the lightest or the heaviest vehicles with equal facility.

In Fig. 5 one of the spokes is shown provided with a supplemental or bracing leaf 41 which may be employed when a wheel of abnormal strength is required.

Having thus described the invention, what is claimed as new is:

1. A wheel comprising a rim, a hub having its periphery formed with a plurality of angular sided projections, a plurality of resilient spokes connected at their outer ends to the rim and bent at the inner ends to conform to the angular projections the bent portions of the spokes being overlapped, and clamping means applied to the overlapping portions of the spokes between the projections.

2. A wheel comprising a rim, a hub, a plurality of resilient spokes connected respectively to the hub and to the rim, a member mounted for rotation relative the hub, a plurality of flexible members connected respectively to the rim and to the rotative member, and means for clamping said rotative member to the hub.

3. A wheel comprising a rim, a hub, a plurality of resilient spokes connected respectively to the hub and to the rim, a member mounted for rotation relative the hub and provided with a plurality of radial slots, a plurality of flexible members connected respectively at one end to the rim, fastening devices carried by the rotative member and connected to the flexible members at the other end, and means for clamping said rotative member to the hub.

In testimony whereof I affix my signature in presence of two witnesses.

FRANK J. SINGLER. [L. S.]

Witnesses:
  ROBERT L. FUNK,
  FRANKLIN P. COCKELREEKS.

Copies of this patent may be obtained for five cents each, by addressing the "Commissioner of Patents, Washington, D. C."